United States Patent [19]

Jacobsson et al.

[11] Patent Number: 5,299,392
[45] Date of Patent: Apr. 5, 1994

[54] PORTABLE POWER GRINDER

[75] Inventors: Rolf A. Jacobsson, Saltsjö-Boo; Jan K. J. Edling, Älvsjö, both of Sweden

[73] Assignee: Atlas Copco Tools AB, Nacka, Sweden

[21] Appl. No.: 82,021

[22] Filed: Jun. 23, 1993

[30] Foreign Application Priority Data

Jun. 29, 1992 [SE] Sweden .............................. 9201991-8

[51] Int. Cl.⁵ .............................................. B24B 23/00
[52] U.S. Cl. ................................ 51/170 R; 51/134.5 F; 173/216
[58] Field of Search ........... 51/170 R, 170 T, 170 PT, 51/170 MT, 134.5 F; 173/176, 179, 216, 217; 91/59; 418/40, 41, 42, 43, 44; 137/50, 56, 57

[56] References Cited

U.S. PATENT DOCUMENTS 4,444,272 4/1984 Karden et al.

Primary Examiner—Roscoe V. Parker
Attorney, Agent, or Firm—Frishauf, Holtz, Goodman & Woodward

[57] ABSTRACT

A portable power grinder comprises a housing (11), a rotation motor (10) with a rotor (13) having a rear end portion (27) extending out of the motor (10), an output shaft (22) which is drivingly coupled via a reduction gearing (23) to the rotor shaft (13) and intended to carry a grinding tool, and a speed governor (18) for providing a constant motor speed. The reduction gearing (23) comprises a gear (24) integral with the rotor shaft (13) and another gear (25) integral with the output shaft (22). Alternative rotor shafts (13) with gears (24) of different sizes may replace each other for obtaining different gear ratios and different output speed levels, and the length of the rear end portion (27) of the rotor shafts (13) varies with the size of the integral gear (24). The housing (11) has a detachable lid (15) carrying the speed marking (2) of the tool and having an internal projection (28) of a size directly related to the speed level readable on the speed marking (21). The rear rotor shaft end portion (27) has a shape directly related to the maximum speed level provided by the actually fitted rotor shaft (13), and the lid projection (28) matches such rotor shaft end portions (27) only that correspond to gear ratios providing output speeds equal to or lower than the speed marking level.

4 Claims, 1 Drawing Sheet

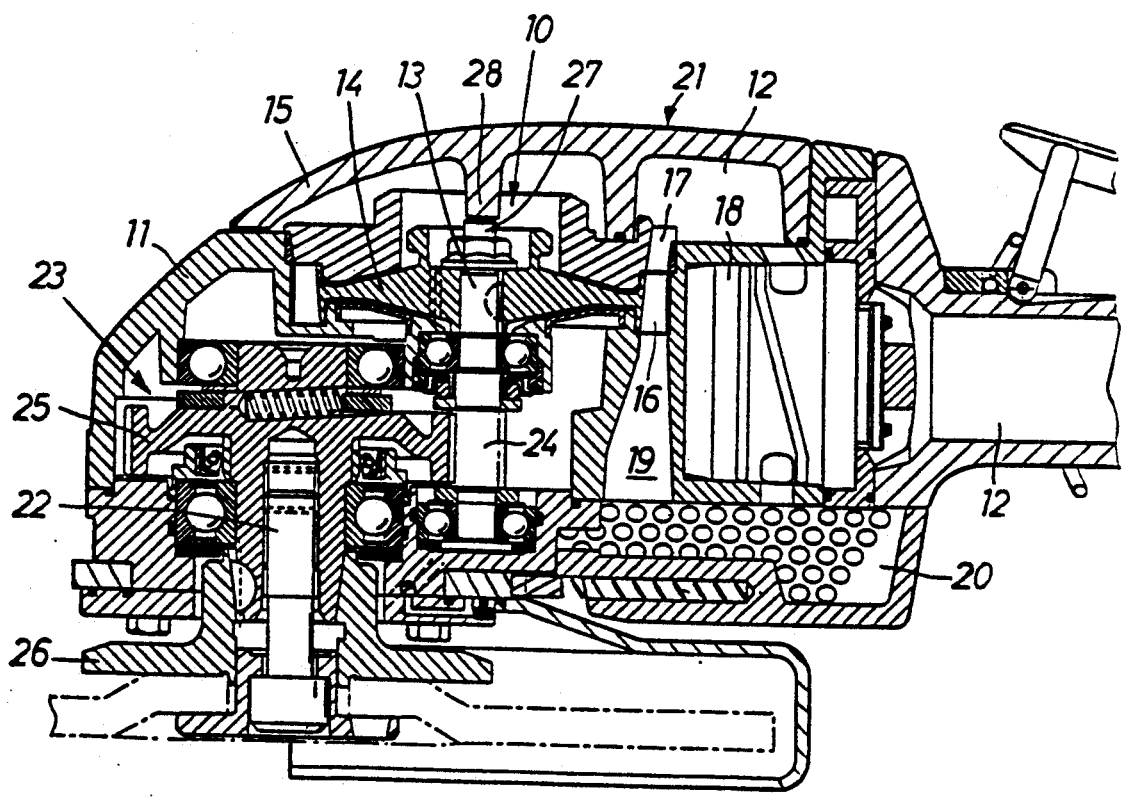

PORTABLE POWER GRINDER

BACKGROUND OF THE INVENTION

This invention concerns a portable power grinder of the type including a housing, a rotation motor with a rotor shaft having a rear end portion extending out of the motor, an output shaft drivingly coupled to the motor rotor and intended to carry a grinding tool, and a speed governor for providing a constant motor speed.

A serious problem to deal with at in rotating power grinders is the risk for accidentally reaching overspeed and a resulting fast disintegration or blowing up of the grinding wheel. This may occur as a result of malfunction of the speed governor of the grinding tool or, perhaps more commonly, as a result of using a grinding wheel intended for a much lower maximum speed.

One reason why an improper grinding wheel may be mounted on the output shaft is that the maximum speed marking on the tool housing is incorrect. The marking may not inform of the maximum speed level provided by the speed limiting means actually mounted in the tool. Most suppliers of power grinding tools offer a number of different speed limiting means fitting into the same tool housing but providing different maximum speed levels, and if a tool is assembled with a speed limiting means which provides a higher maximum speed level than what is informed of by the tool housing marking, there is a great risk that the grinding wheel attached to the output shaft will not withstand the inertia forces generated at this higher speed level.

It is an object of the invention to create a solution to the above problem by providing an improved power grinder design which ensures that the maximum speed level provided by the speed limiting means does not exceed the speed level informed of by the tool housing marking.

A previously known power grinder having a speed marking which safely corresponds to the speed limiting means actually fitted in the tool housing is shown in U.S. Pat. No. 4,444,272. In this prior art tool, the speed marking is located on top of a non-rotating cup-shaped member forming an integral part of the speed governor and overspeed safety device of the tool. This cup-shaped member is exposed through an aperture in the tool housing such that the speed marking is readable from outside the housing.

This known speed marking arrangement, however, is restricted in its applicability to power grinders having fly-weight actuated speed governors and overspeed safety devices which are mounted at the rear end of the motor shaft.

This restricted applicability is a drawback which is avoided by a power grinder according to the invention.

Other features and advantages of the invention appear from the following specification and claims.

BRIEF DESCRIPTION OF THE DRAWING

A preferred embodiment of the invention is described below with reference to the accompanying single figure which shows a longitudinal section through a portable power grinder according to the present invention.

DETAILED DESCRIPTION

In the drawing figure, there is shown a longitudinal section through a portable power grinder according to the invention. The shown example comprises an air turbine 10 a rotation motor which is located in a housing 11 and supplied with motive pressure air through an inlet passage 12.

The housing 11 comprises a detachable lid 15 which covers the rear end of the turbine 10 and which forms a part of the air inlet passage 12. When the lid 15 is removed the air inlet passage 12 is open to the atmosphere and no motive pressure air can reach the turbine 10. The lid 15 forms the upper part of the tool housing 11 and carries the speed marking 21 of the tool. The speed marking 21 informs of the maximum speed level of the output shaft 22 and is crucial for the choice of grinding wheel to be mounted on the output shaft 22.

The turbine comprises a rotor shaft 13 and a turbine wheel 14. The latter is formed with a peripheral row of blades 16 on which motive pressure air is directed from a number of nozzles 17. Pressure air is supplied to the nozzles 17 via the inlet passage 12 and a speed governor valve 18. Downstream of the turbine wheel 14 there is an exhaust passage 19 and a silencer 20.

The speed limiting means of this tool comprises both governor valve 18 which is controlled by a certain speed related control pressure obtained in the turbine 10 and a reduction gearing 23 with an exchangeable gear ratio. The governor valve 18 is arranged to maintain the turbine speed constant. Different output shaft speed levels are accomplished by changing the gear ratio of the reduction gearing 23.

There is, however, only one version of the governor valve 18 available, which means that overspeed can not be the result of fitting the tool with a governor valve operating at too a high speed level in relation to the speed marking 21.

Since the speed governor valve 18 per se is not an essential part of the invention it is not described in detail.

The turbine rotor shaft 13 is drivingly coupled to the output shaft 22 via the reduction gearing 23 which comprises a first gear 24 on the rotor shaft 13 and a second gear 25 on the output shaft 22. Both gears 24 and 25 are integral with their respective shafts 14 and 22. The output shaft 22 is provided with a mounting means 26 for attachment of a grinding wheel.

In a tool of this type having an air turbine as rotation motor it is necessary to use a reduction gearing, because the turbine rotation speed of about 60 000 rpm has to be reduced 7 to 10 times to be useful for grinding wheel operation. Once you have a reduction gearing it is more beneficial to change the gear ratio than fitting different speed governors 18 to obtain different output speed levels. Accordingly, it is possible to have tools with different output speed levels, although the turbine 10 and the speed governor 18 are all the same.

Changing the reduction gear ratio means that the rotor shaft 13 as well as the output shaft 22 are exchanged for another set of shafts having gears of other sizes.

The rotor shaft 13 is formed with a rear end portion 27 the length of which varies with the size of the integral gear 24 such that a longer end portion 27 corresponds to a bigger gear 24.

Opposite the rotor shaft end portion 27, the lid 15 is formed with an internal projection 28 the height of which is related to the speed level informed of by the speed marking 21 on top of the lid 15. This means that there is available a number of interchangeable lids 15 with different speed markings 21 and differently shaped internal projections 28.

The speed markings 21 and internal projections 28 of the lids 15 are matched to the rotor shaft rear end portions 27 and, accordingly, to the gear ratio of the reduction gearing 23. This means that a lid 15 with a certain speed level marking can only be mounted on a tool having a reduction gearing 23 that provides an output shaft speed that is equal to or lower than speed level informed of by the speed marking 21. So, if one tries to mount a lid with a certain speed marking 21 and a corresponding projection size on a housing containing a gearing with too a low reduction ratio, i.e. a turbine rotor shaft 13 with too a big gear 24 and too a long rear end portion 27, the projection 28 will abut against the rotor shaft end portion 27 and make a correct lid mounting impossible. The lid 15 will not land properly on the housing 11 and the pressure air inlet passage 12 will not be sealed off from the atmosphere so as to enable starting of the tool.

The above arrangement means that a lid 15 with a certain speed marking 21 can never be fitted to a tool containing an output shaft 22 which runs faster than the maximum speed level informed of by the speed marking 21.

We claim:

1. In a portable power grinder, comprising a housing (11), a rotation motor (10) with a rotor shaft (13) having a rear end portion (27) extending out of said motor (10), an output shaft (22) drivingly coupled to said rotor shaft (13) and intended to carry a grinding tool, and a speed governor (18) for providing a constant motor speed, the improvement wherein:

said rotor shaft (13) is drivingly coupled to said output (22) by a reduction gearing (23) which comprises a gear (24) on said rotor shaft (13) and another gear (25) on said output shaft (22), said gear (24) on said rotor shaft (13) is integral with said rotor shaft (13), said rotor shaft (13) is replaceable by another one of a number of alternative rotor shafts having integral gears (24) of different sizes for providing different speed levels on said output shaft (22), all of said alternative rotor shafts (13) have differently shaped rear end portions (27), said housing (11) includes a lid (15) covering the rear end portion (27) of said rotor shaft (13), which lid (15) is replaceable by one of a number of alternative lids carrying individual markings stating the maximum speed level of the output shaft (22), and each of said alternative lids (15) is individually shaped to fit those tools only which have a rotor shaft (13) end portion shape and an integral gear (24) that correspond to an output shaft (22) speed level which is equal to or lower than that stated by marking on that particular lid (15).

2. Power grinder according to claim 1, wherein said rear end portion (27) of each of said alternative rotor shafts (13) has a length corresponding to the size of the gear (24) integral with rotor shaft (13) as well as to the maximum speed level of said output shaft (22).

3. Power grinder according to claim 1, wherein said motor (10) is a pneumatic motor supplied with pressure air through an inlet passage (12) in said housing (11), and said lid (15) defines partly said inlet passage (12).

4. Power grinder according to claim 2, wherein said motor (10) is a pneumatic motor supplied with pressure air through an inlet passage (12) in said housing (11), and said lid (15) defines partly said inlet passage (12).

* * * * *